(No Model.)

F. MORETON.
ELECTRO MEDICAL BATTERY.

No. 415,345. Patented Nov. 19, 1889.

Witnesses.
Edgar George
Benjamin King.

Inventor:
Francis Moreton
per James Stevenson
Attorney.

N. PETERS, Photo-Lithographer, Washington, D. C.

UNITED STATES PATENT OFFICE.

FRANCIS MORETON, OF LONDON, ENGLAND.

ELECTRO-MEDICAL BATTERY.

SPECIFICATION forming part of Letters Patent No. 415,345, dated November 19, 1889.

Application filed December 3, 1888. Serial No. 292,528. (No model.) Patented in England November 7, 1888, No. 16,146.

*To all whom it may concern:*

Be it known that I, FRANCIS MORETON, a subject of the Queen of Great Britain, and a resident of No. 188 Camden Road, London, N. W., England, have invented certain new and useful Improvements relating to Electro-Medical Batteries, (for which I have obtained a patent in Great Britain, No. 16,146, bearing date November 7, 1888,) of which the following is a specification.

My invention has for its object to produce a voltaic or galvanic battery applicable for medical and other purposes, whereby I am enabled to obtain a high electro-motive force from a battery occupying little space.

In order that my invention may be the better understood, I have appended the accompanying sheet of drawings, in which—

Figure 1:
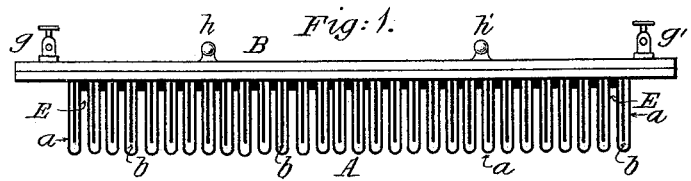
Figure 2:
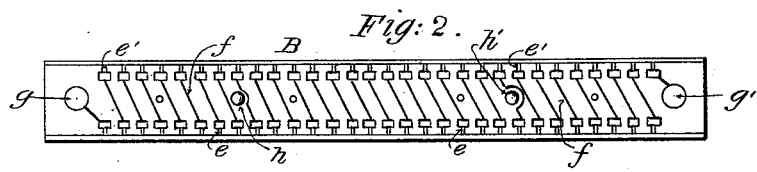
Figures 3, 6, 7:
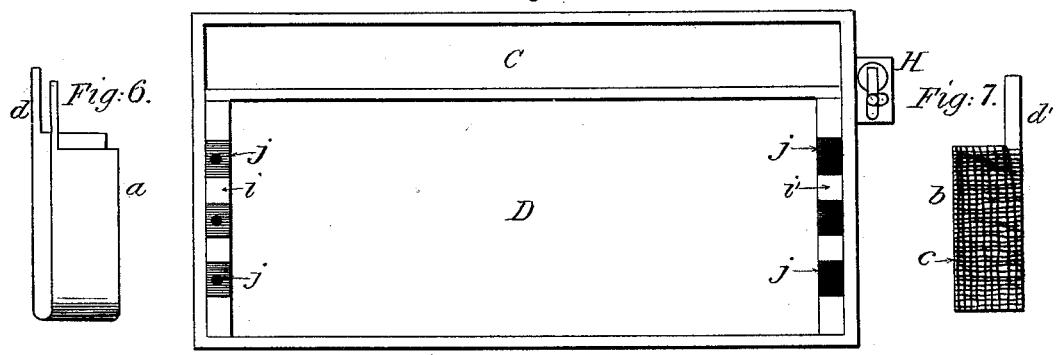
Figure 4:
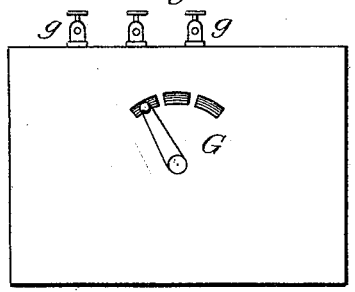
Figure 8:
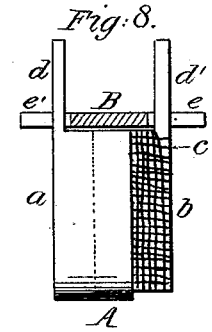
Figure 5:
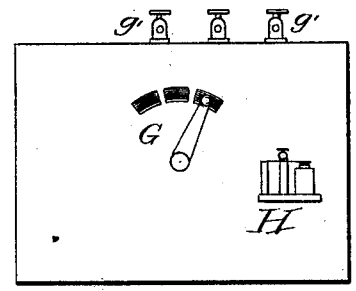

Figure 1 is an elevational view of a number of pairs of elements secured to a frame to form a battery according to my invention. Fig. 2 is a plan of the frame to which the elements are secured. Fig. 3 is a plan of a compound trough or receptacle for the battery. Figs. 4 and 5 are elevational views of the two ends of a trough or receptacle. Fig. 6 is an elevational perspective view of one of the elements bent into U shape. Fig. 7 is a similar view of the other element; and Fig. 8 is a sectional view of the frame, showing the two elements in position.

In accordance with my invention I form a battery of a number of pairs A of dissimilar elements, one of which $a$ is electro-negative to the other $b$—such, for instance, as copper and zinc—and secure said elements independently of each other to a support or frame B, in the manner shown in Fig. 1. The negative element $a$—say the copper—is formed of a long strip of the metal and bent into a U shape, Figs. 1 and 6. The positive element $b$ is a flat strip of zinc of the same width and of nearly the same length as the negative element $a$, and is surrounded by a thin layer of a suitable absorbent material; or, if preferred, it may be bound around with a thread $c$, Figs. 7 and 8, or by threads of worsted or other suitable material or substance capable of absorbing and holding in suspension the fluid-exciting medium, said absorbent material serving, also, to prevent metallic contact between the two elements.

The elements above described are provided with tongue-pieces $d$ $d'$ for insertion into slots $e$ $e'$, formed in the two edges of the support or frame B aforesaid, Figs. 2, 6, 7, and 8.

Instead of the slots $e$ $e'$, above referred to, for the reception of the tongue-pieces $d$ of the elements, I may under some circumstances bore, drill, or otherwise form a number of holes in the support or frame B, in which are inserted the tongue-pieces above described of the elements.

In making up or arranging a battery in accordance with my invention the tongue-pieces $d$ of the copper elements $a$ are inserted in the slots $e'$, doubled over, and secured in any suitable manner to the upper surface of the support or frame B. In like manner the tongue-pieces $d'$ of the zinc elements are inserted in the slots $e$ of the frame, doubled over, and secured thereto by any convenient means. When secured as above described, each pair of elements A will assume the position shown in Fig. 8—that is to say, the enveloped zinc element $b$ will be suspended centrally within the U-shaped copper element $a$.

By the above-described means of arranging the elements any one of said elements may be removed when found necessary without disturbing or interfering with any of the others. Between each pair of elements I insert a strip or plug E, Fig. 1, of non-conducting material for the twofold purpose of preventing any two copper elements from coming into contact at the lower ends thereof, as also to insure greater strength at the points of attachment to the support or frame B aforesaid. The connections between the opposite elements are made by narrow strips of metal disposed across the frame B, as shown at $f$, Fig. 2, the terminal copper element being attached to a connecting-post $g$ and the terminal zinc element to the connecting-post $g'$.

The trough or inclosing-case for containing the elements is formed, preferably, of two chambers C D, Fig. 3, in which are inserted acid-proof receptacles, the trough C being devised for holding the exciting-solution, and the trough D for collecting the overplus or droppings from the elements A.

When about to use the battery, the frame B is raised by means of the knobs or handles $h\ h'$, and the elements dipped into the exciting medium in the trough C, the absorbent material surrounding the zinc elements $b$, and separating said zincs from the copper elements $a$, having taken sufficient of which excitant, the elements are removed therefrom and dropped into the trough D, the ends of the frame B supported by and resting in recesses $i\ i'$, formed in the ends of the inclosing-case. A contact-breaker H, of any desired description, may also be introduced in the circuit to allow of the administration of an intermittent current. Said contact-breaker may be electro-magnetic, as shown, or, if desired, it may be a mechanical contrivance to be actuated by the person to whom the current of electricity is being administered. Suitable flexible-wire cords, to which handles are attached, are employed to convey the current from the battery to the person to be treated.

A battery produced as above described according to my invention, while being very portable and occupying little space, is extremely powerful, and is specially applicable for use in cases of rheumatism and similar complaints, while it is at the same time well adapted for use in cautery and other surgical operations.

Having fully described my invention, what I claim, and desire to secure by Letters Patent, is—

A galvanic or voltaic battery made up of a number of pairs of dissimilar metallic elements, each element being independently secured to a supporting frame or board B, so as to be readily removable therefrom, and having a strip or block of insulating material interposed between each pair of elements for the purpose of preventing metallic contact between the elements, as also to impart additional strength to the tongue-pieces thereof, substantially as set forth.

In testimony that I claim the foregoing as my invention I affix my signature in presence of two witnesses.

FRANCIS MORETON.

Witnesses:
JAMES STEVENSON,
*Civil Engineer and Patent Agent,* 20 *High Holborn, London, W. C.*
EDGAR GEORGE,
*Electrician,* 20 *High Holborn, W. C., London.*